United States Patent [19]

Prince

[11] 4,090,598

[45] May 23, 1978

[54] SINGLE LEVER REMOTE CONTROL

[75] Inventor: Anthony P. Prince, Waukegan, Ill.

[73] Assignee: Outboard Marine Corporation, Waukegan, Ill.

[21] Appl. No.: 767,556

[22] Filed: Feb. 10, 1977

[51] Int. Cl.[2] .............................................. B60K 41/02

[52] U.S. Cl. ...................................... 192/.096; 74/876

[58] Field of Search ................ 192/.096, .098; 74/876, 74/877

[56] References Cited

U.S. PATENT DOCUMENTS

| | | | |
|---|---|---|---|
| 2,924,987 | 2/1960 | Pierce | 74/876 |
| 3,115,050 | 12/1963 | Marr | 192/.096 X |
| 3,335,618 | 8/1967 | Russey | 192/.096 X |

FOREIGN PATENT DOCUMENTS

| | | | |
|---|---|---|---|
| 182,436 | 1/1963 | Sweden | 192/.096 |

*Primary Examiner*—Roy Lake
*Assistant Examiner*—E. F. Desmond
*Attorney, Agent, or Firm*—Michael, Best & Friedrich

[57] ABSTRACT

Disclosed herein is a single lever control for the throttle and clutch of a marine propulsion device including a housing pivotally supporting a shaft member for relative lateral or axial movement between first and second positions, a main control lever connected to the shaft member for common axial movement and for common rotary movement from a neutral position, a throttle drive member connected to the shaft member for common rotary movement and for relative axial movement of the shaft member, and a clutch shift drive member mounted on the shaft member for relative rotation and for common axial movement. The clutch shift drive member includes a drive lug which, when the shaft member is in the first position, is receivable in and drivingly engages a drive notch in the throttle drive member to provide common rotary movement of these two members in response to pivotal movement of the main control lever from the neutral position. When the shaft member is moved axially to the second position in response to outwardly lateral or axial movement of the main control lever, the clutch shift drive member is moved to a disengaged position wherein the throttle drive member can be rotated or pivoted relative to the clutch shift drive member by the main control lever so that the engine throttle can be operated independently of the clutch for engine warm-up.

14 Claims, 12 Drawing Figures

SINGLE LEVER REMOTE CONTROL

BACKGROUND OF THE INVENTION

The invention relates generally to single lever controls for regulating the throttle and clutch associated with an internal combustion engine. More specifically, the invention relates to single lever controls for marine propulsion devices, such as outboard motors and stern drive units.

Single lever controls generally include a main control lever which is pivotally movable in opposite directions from a neutral position through a clutch operating range to effect clutch operation without affecting the engine throttle setting and subsequently through a throttle control range whereby the engine speed is increased without affecting clutch actuation. As a result, clutch actuation occurs before there is an appreciable advancement of the throttle and the clutch cannot be reversed before the throttle is returned to an idle speed setting.

One type of single lever control includes means for selectively disconnecting the main control lever from the clutch actuating mechanism when the main control lever is in the neutral position so that the main control lever can be moved independently of the clutch actuation mechanism to advance the throttle setting while the clutch is in the neutral position. Prior art constructions for this type of single lever control often include fairly complex mechanisms. particularly when lockout means are provided for preventing clutch actuation when the throttle is at an advanced setting, and usually require lateral movement of the push-pull control cable(s) connecting the control to the remotely located engine clutch and/or throttle. Examples of prior art single lever controls of this type are disclosed in the following U.S. Pat. Nos. Parsons, 2,986,044, issued May 30, 1961; Morse et al., 3,127,785, issued Apr. 7, 1964; Morse et al., 3,204,732, issued Sept. 7, 1965; Pervier, 3,309,938, issued Mar. 21, 1967; Farrington et al., 3,842,695, issued Oct. 22, 1974.

SUMMARY OF THE INVENTION

The invention provides a single lever control including a housing, a shaft member rotatably supported within the housing for relative axial movement between a first position and a second position laterally or axially spaced from the first position, a main control lever connected to the shaft member for common rotation therewith from a neutral position and for common axial movement therewith, a throttle drive member connected with the shaft member for common rotation therewith and for relative axial movement thereto, a clutch shift drive member connected with the shaft member for relative rotation and for common axial movement therewith relative to the throttle drive means, and drive means on the throttle drive member and on the clutch shift member located for engagement to provide common rotary movement when the shaft member is in the first position and for disengagement to permit rotation of the throttle drive member relative to the clutch shift drive member, in response to rotational movement of the main control lever from the neutral position, when the shaft member is in the second position.

In one embodiment, means are provided for automatically returning the clutch shift drive member to an engaged position when the main control lever is returned to the neutral position.

In one embodiment, lockout means are provided for permitting axial movement of the clutch shaft drive member from an engaged to a disengaged position when the main control lever is in the neutral position and for preventing axial movement of the clutch shift drive member from the engaged position when the main control lever is displaced from the neutral position.

In one embodiment, the lockout means further includes means for preventing both rotational movement of the clutch shift drive member from the neutral position and axial movement of the clutch shift drive member from the disengaged to the engaged position when the shaft member is in the second position and the main control lever is displaced from the neutral position.

One of the principal features of the invention is the provision of a single lever control including means for selectively disconnecting a main control lever from a clutch actuating mechanism, in response to axial movement of the main control lever, to afford independent throttle advance with the main control lever, which means does not require lateral or axial displacement of a control linkage connecting the control to a clutch.

Another of the principal features of the invention is the provision of such a single lever control including a main control lever, a throttle drive member operatively connected to the main control lever, a clutch shift drive member supported for rotation relative to the throttle drive member between a neutral position and a shift position and connected to the main control lever for common axial movement therewith, and drive means on the throttle drive member and on the clutch shift drive member located for engagement to provide common rotary movement when the main control lever is in a normal operating position and for disengagement to permit rotation of the throttle drive member relative to the clutch shift drive member when the main control lever is moved axially to a disconnect position.

A further principal feature of the invention is the provision of a single lever control described in the preceding paragraph including a simple lockout means for permitting the main control lever to be moved to the disconnect position when it is in a neutral position but preventing it from being moved to the disconnect position when it is displaced from the neutral position.

A further principal feature of the invention is the provision of a single lever control described in the preceding paragraph wherein the lockout means further includes means for preventing both rotational movement of the clutch shift drive member from the neutral position and axial movement from the disengaged position when the main control lever is in the disconnect position and is displaced from the neutral position.

A further principal feature of the invention is the provision of a single lever control described in the preceding paragraph including means for automatically returning the main control lever to a connected position when it is returned to the neutral position.

Other features and advantages of the embodiments of the invention will become apparent to those skilled in the art upon reviewing the following detailed description, the drawings, and the appended claims.

Figure 2:
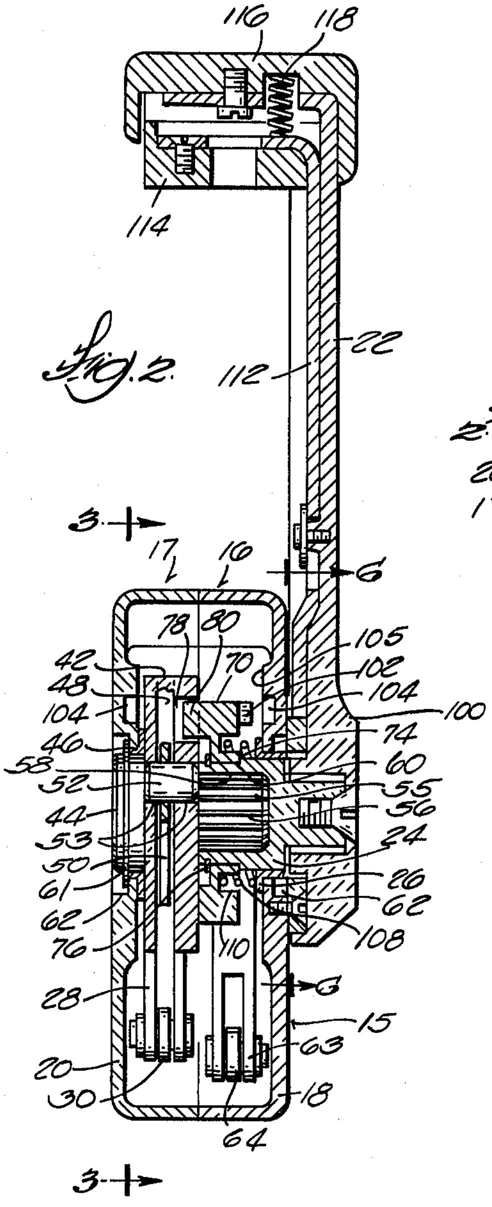
FIG. 2 is an enlarged sectional view taken generally along line 2—2 in FIG. 1, illustrating the location of various of the components when the main control lever is in the neutral position and in a connected position for coordinated operation of the engine throttle and clutch.
Figure 1:
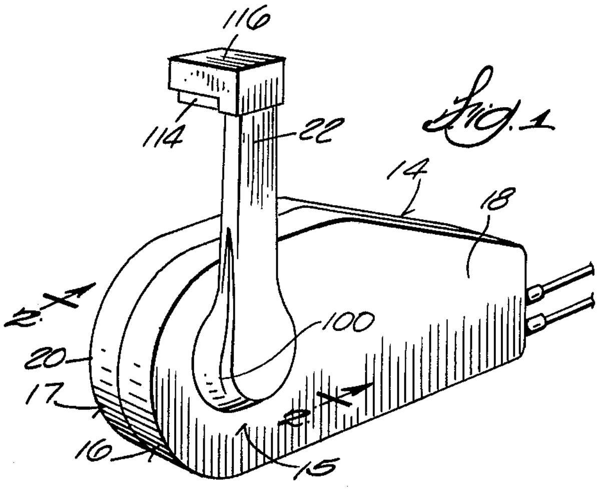
FIG. 1 is a perspective view of a single lever control which is particularly adapted for use with a marine propulsion device and embodies various features of the invention.
Figure 6:
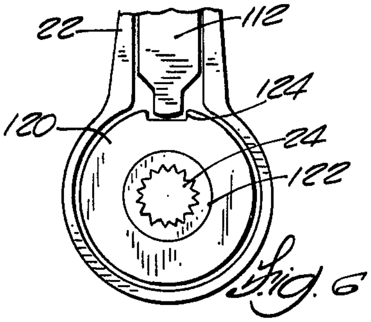
FIG. 6 is a fragmentary, reduced sectional view taken generally along the line 6—6 in FIG. 2.
Figure 5:
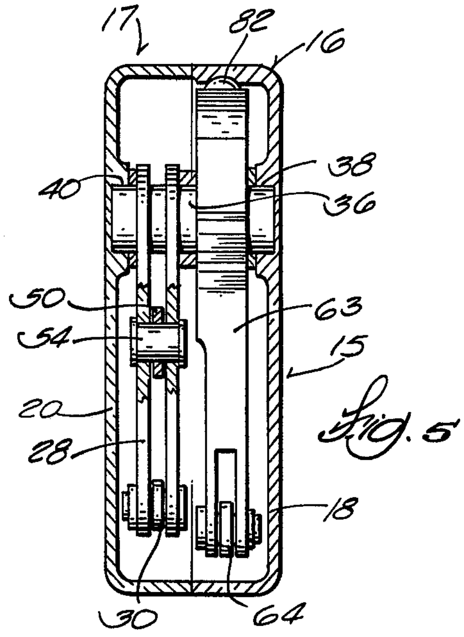
FIG. 5 is a sectional view taken generally along the line 5—5 in FIG. 3.
Figure 7:
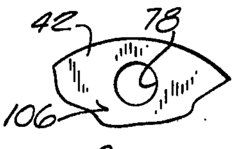
FIG. 7 is a fragmentary view of the throttle drive member.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

BRIEF DESCRIPTION OF THE PREFERRED EMBODIMENTS

Illustrated in the drawings is a single lever control for operating the clutch and throttle of a remotely located marine propulsion device such as an outboard motor or stern drive unit. Referring to FIGS. 1-7, a single lever control 14 embodying various features of the invention includes (see FIGS. 1 and 2) a housing 15 comprised of opposed cover halves or sections 16 and 17 which includes respective side walls 18 and 20 and which are suitably fastened together to form a generally closed housing.

The single lever control 14 includes a main control lever 22 mounted exteriorly of the housing 15 for both pivotal or rotational movement and lateral or axial movement relative to the housing 12. Provided in part for this purpose (see FIG. 2) is a shaft member 24 having one end journaled in the housing section 16 via a bearing 26. The shaft member 24 is suitably connected to the lower end of the main control lever 22 for both common rotation and common lateral or axial movement therewith.

Throttle control is provided by (see FIGS. 2, 3 and 4) a throttle arm or lever 28 which, at its lower end, is adapted for connection to a push-pull link or cable 30 operatively connected to a remotely located engine throttle (not shown). The upper end of the throttle lever 28 is pivotally mounted on an axle or shaft 36. The opposite ends of the shaft 36 are received in recesses 38 and 40 provided in the cover sections 16 and 17, respectively (see FIG. 5).

Figure 3:
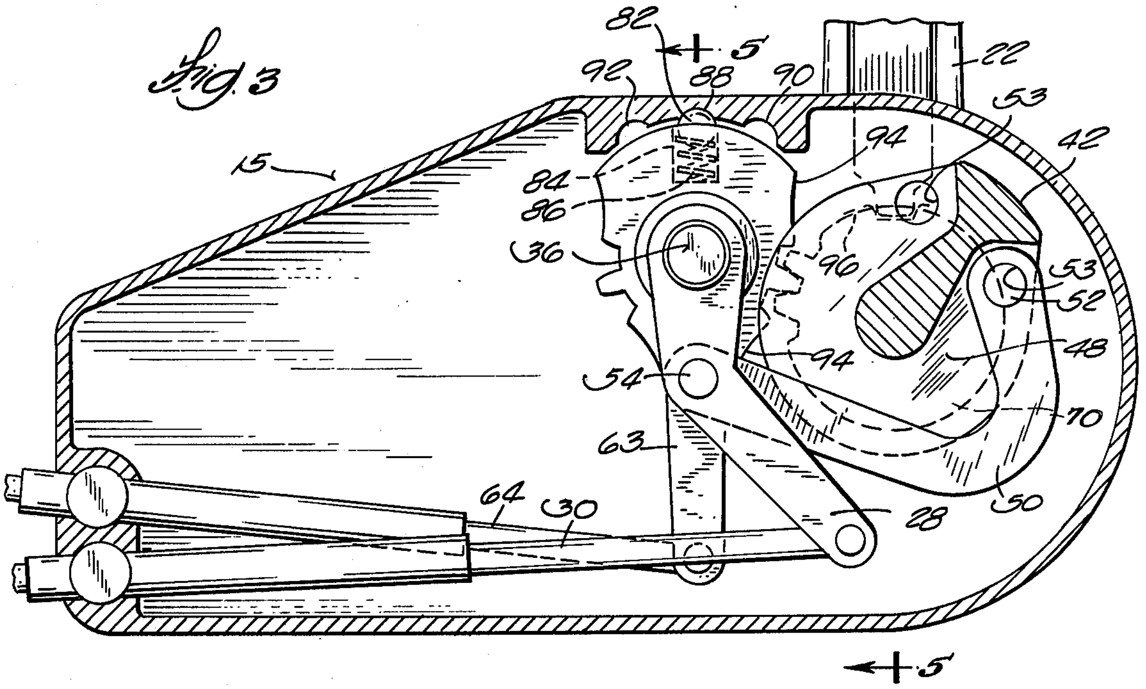
FIG. 3 is a fragmentary, sectional view taken generally along line 3—3 in FIG. 2, illustrating the location of various of the components when the main control lever is in the neutral position.
Figure 4:
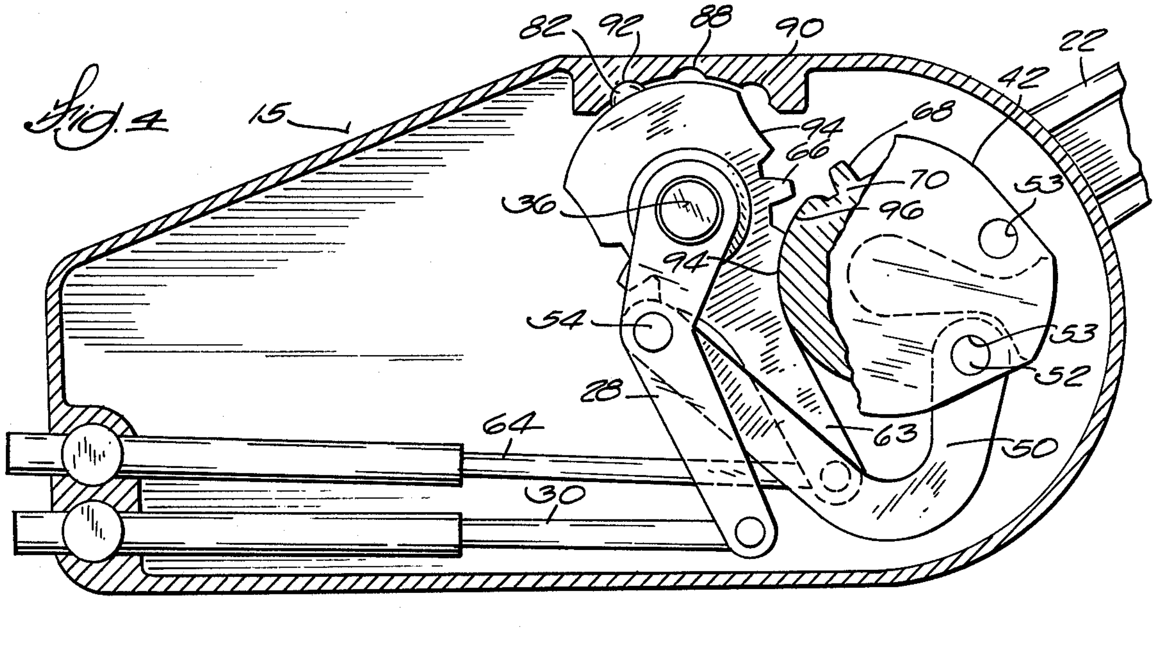
FIG. 4 is a view similar to FIG. 5, illustrating the location of various of the components when the main control lever is in the forward speed range.
Figure 8:
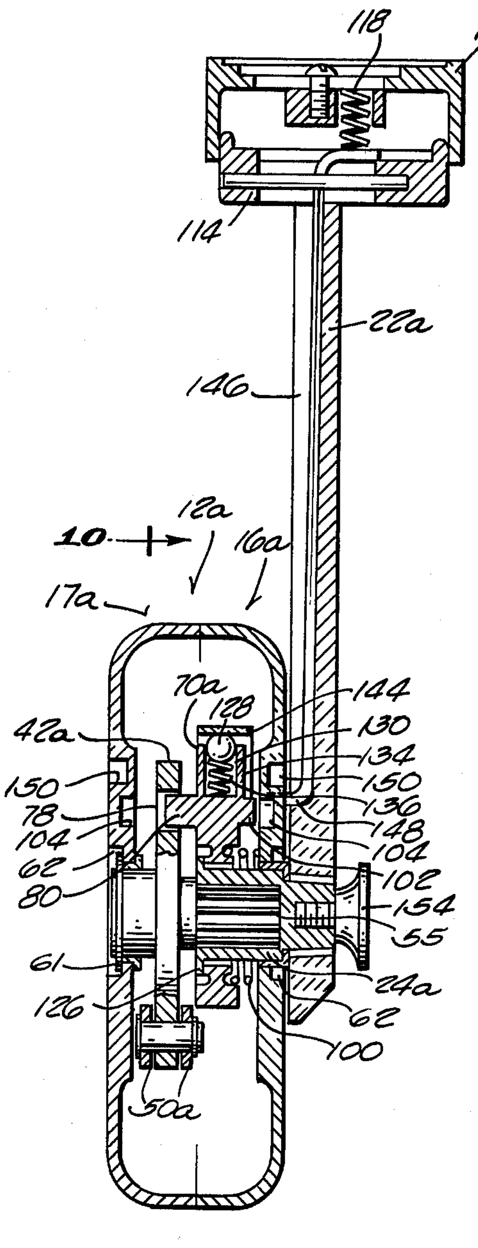
FIG. 8 is a cross sectional view of an alternate construction of a single lever control embodying various of the features of the invention.
Figure 9:
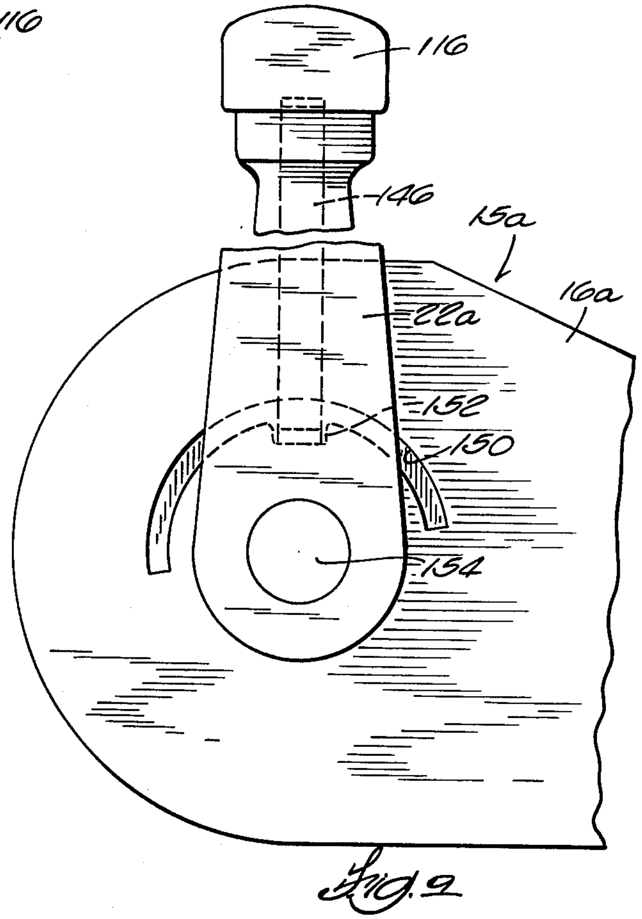
FIG. 9 is a fragmentary side elevational view of the single lever control shown in FIG. 8.
Figure 12:
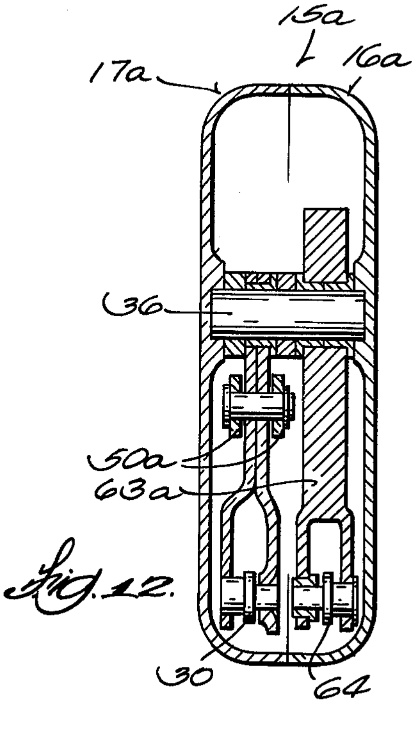
FIG. 12 is a sectional view taken generally along line 12—12 in FIG. 10.
Figure 10:
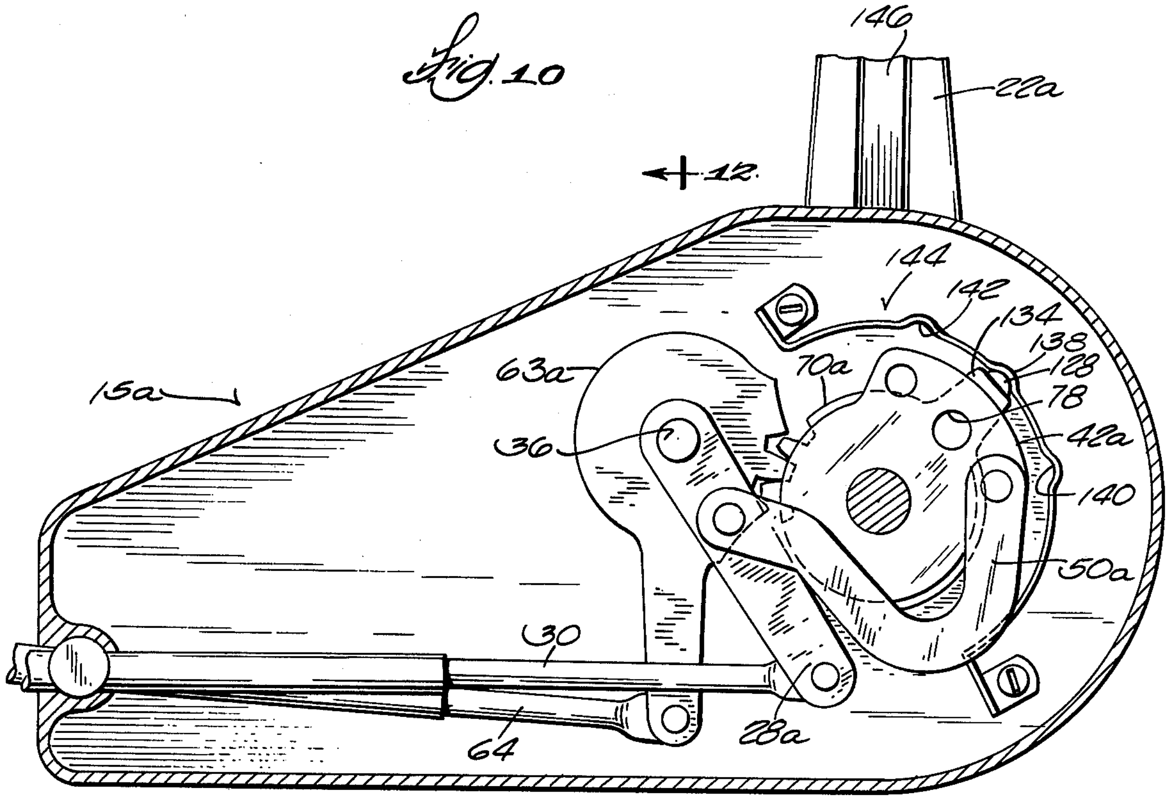
FIG. 10 is a fragmentary, sectional view taken generally along line 10—10 in FIG. 8, illustrating the location of various of the components when the control lever is in the neutral position.
Figure 11:
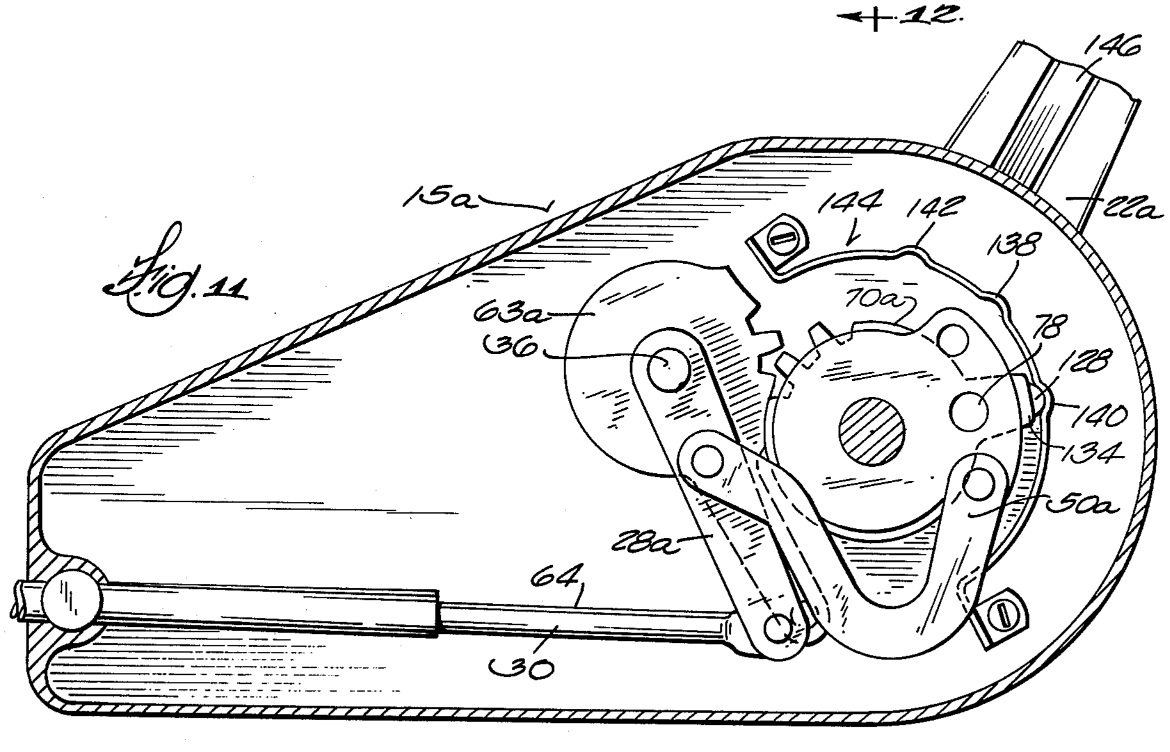
FIG. 11 is a view similar to FIG. 10, illustrating the location of various of the components when the main control lever is in the forward speed range.

Means are provided for operatively connecting the throttle lever 28 to the main control lever 22 to control movement of the throttle lever 28 in response to pivotal or rotational movement of the main control lever 22 relative to the neutral position shown in FIG. 3. In the specific construction illustrated, such means includes (see FIGS. 2, 3, 4 and 5) a throttle drive member 42 having an outer hub 44 journaled in the cover section 16 via a bearing 46 to afford rotation of the throttle drive member 42 coaxially with the shaft member 24. The throttle drive member 42 also includes an internal slot 48 for accommodating a drive link 50 which at one end is pivotally connected to the throttle drive member 42, such as by a pin 52 mounted in apertures 53 provided in the throttle drive member 42, and at the other end is pivotally connected to the throttle lever 28 at 54. Rotation of the throttle drive member 42 about the axis of the outer hub 44, in either rotative direction from an idle position corresponding to the neutral position of the main control lever 22, advances the engine throttle.

Means are provided for connecting the throttle drive member 42 to the shaft member 24 for common rotation therewith and for permitting axial movement of the shaft member 24, and thus the main control lever 22, relative to the throttle drive member 42. In the specific construction illustrated, such means includes (see FIG. 2) an inner hub 55 provided on the throttle drive member 42 coaxially with the outer hub 44. Provided on the outer surface of the inner hub 55 is a plurality of axially extending, circumferentially spaced splines 56 which are slidably received by and mesh with complementary axially extending, circumferentially spaced splines 58 provided on the interior surface of a central bore 60 in the inner end portion of the shaft member 24. Axial movement of the throttle drive member 42 relative to the housing 12 is restrained by the outer surface thereof engaging an internal shoulder of the bearing 46 and by a retainer ring 61 carried by the outer hub 42 and bearing against the bottom wall of an external recess 62 provided in the cover section 17.

Clutch control is provided by (see FIGS. 3, 4 and 5) a gear shift arm or lever 63 rotatably or pivotally mounted on the shaft 36 with the lower end adapted for connection to a push-pull link or cable 64 which is operatively connected to a remotely located engine clutch (not shown). The gear shift lever 63 includes a gear segment 66 which meshes with a cooperating gear segment 68 provided on a shift drive member 70 which is mounted on the shaft member 24 for rotation coaxially with the throttle drive member 42 between a neutral position and a shift position.

Means are provided for connecting the shift drive member 70 with the shift member 24 to permit relative rotation between the shaft member 24 and the shift drive member 70 and to permit common axial movement of the shift drive member 70 with the shaft member and, thus with the main control lever 22. In the specific construction illustrated, (see FIG. 2) the shift drive member 70 is rotatably mounted on the inner end portion of the shaft member 24. One edge of the shift drive member 70 is engaged by a radially extending shoulder 74 provided on the shaft member 24 and the other edge is engaged by a retainer ring 76 carried on the inner end portion of the shaft member 24, when the shaft member 24 is moved axially relative to the housing 15 in response to axial movement of the main control lever 22.

Provided on the throttle drive member 42 and on the shift drive member 70 are drive means located for engagement to provide common rotary movement therebetween when the shaft member 24 is in a first position and for disengagement to permit rotation of the throttle drive member 42 relative to the shift drive member 70 when the shaft member 24 is in a second position laterally or axially spaced from the first position. In the specific construction illustrated, such drive means (see FIG. 2) includes providing the throttle drive member 42 with a drive recess a notch 78 which receives and is drivingly engaged by a drive lug 80 on the shift drive member 70. During normal operation, the drive lug 80 projects into the drive notch 78 and the shift drive member 70 and the throttle drive member 42 rotated in unison in response to pivotal or rotational movement of the main control lever 22 from the neutral position. The cooperating gear segments 66 and 68 on the gear shift lever 63 and on the shift drive member 70 are arranged so that, when the main control lever 22 is moved in either rotative direction from the neutral position, the gear shift lever 63 is moved to actuate the engine clutch.

Clutch actuation occurs over a predetermined amount of movement of the main control lever from the neutral position in either rotative direction, e.g., about 30°. The corresponding movement of the drive link 50 through an arc about the axis of the shaft member 24 causes very slight displacement of the throttle lever 28, which movement is usually absorbed by the backlash in the cable 30 and in the engine throttle linkage so there is very little, if any, throttle advance.

Detent means can be provided for indicating the neutral position and the ends of the forward and reverse ranges of the gear shift lever 63. In the specific construction illustrated, such detent meand (see FIGS. 3, 4 and 5) comprises a ball 82 slidably mounted in recess 84 in the gear shift lever 63 and biased outwardly by a spring 86 to engage notches 88, 90 and 92 provided in the cover section 16 at locations corresponding to the neutral position, the end of the forward range and the end of the reverse range, respectively.

Movement of the main control lever 22 beyond a shift position causes sufficient movement of the throttle lever 28 to advance the engine throttle setting. When the main control lever 22 has been rotated beyond a shift position in either direction, (see FIGS. 3 and 4) the gear segments 66 and 68 become unmeshed and arcuate surfaces 94 extending on the gear shift lever 63 adjacent the opposite ends of the gear segment 66 slidably engage complementary circular portions 96 extending on the shift drive member 70 adjacent the opposite ends of the gear segment 68. The resultant sliding engagement between the shift drive member 70 and the gear shift lever 63 prevents movement of the gear shift lever 63 from a drive position when the main control lever 22 is moved beyond a shift position to a throttle advance position.

When it is desired to operate the throttle independently of the clutch for engine warm-up, the main control lever 22 is moved laterally or axially relative to the housing 12, i.e., moved to the right as viewed in FIG. 2, by grasping a hand grip 100 provided on the lower portion of the main control lever 22. This lateral movement of the main control lever 22 moves the clutch shift drive member 70 axially relative to the throttle drive member 42 and the drive lug 80 is retracted from the drive notch 78. At the same time the clutch shift drive member 70 moves laterally or axially relative to the clutch lever 63 and, thus, there is no lateral displacement of either the throttle cable 30 or the clutch cable 64. During subsequent rotation of the main control lever 22 from the neutral position, the throttle is advanced in response to movement of the throttle drive member 42 and the shaft member 24 rotates relative to the shift drive member 70, ie., the shift drive member 70 remains in the neutral position and the engine clutch is not actuated.

Lockout means are provided for permitting axial movement of the clutch shift drive member 70 from an engaged position to a disengaged position in response to axial movement of the main control lever 22 when it is in the neutral position, and for preventing axial movement of the clutch shift drive member 70 from the engaged position when the main control lever 22 is displaced from the neutral position. In the specific construction illustrated, such lockout means (see FIG. 2) includes a lockout lug 102 projecting laterally from the shift drive member 70 in a direction opposite to the drive lug 80 and a lockout notch or recess 104 in the interior of the cover section 16. The lockout recess 104 is located and dimensioned to receive the lockout lug 102 and permit the drive lug 80 on the shift drive member 70 to be completely retracted from the drive notch 78 on the throttle drive member 42 when the main control lever 22 is in the neutral position. If outwardly axial movement of the main control lever 22 is attempted when the control lever 22 is displaced from the neutral position, the outer end of the lockout lug 102 engages a surface 105 extending on the interior of the cover section 16 adjacent the lockout recess 104 and prevents the required axial movement of the shaft member 24 to retract the drive lug 80 from the drive notch 78.

The lockout means preferably also includes means for preventing both rotational movement of the shift drive member 70 from the neutral position and axial movement of the shift drive member 70 from the engaged position when the shaft member 24 is in the second position and the main control lever 22 is displaced from the neutral position. In the specific construction illustrated, such means (see FIGS. 2 and 7) includes providing the throttle drive member 42 with camming surfaces 106 which extend from the opposite sides of the drive notch 78 and engage the outer end of the drive lug 80 when the shift drive member 70 is in the disengaged position and the main control lever 22 thereafter is pivoted in either rotative direction from the neutral position. Thus, the camming surfaces 106, in cooperation with the drive lug 80, serve to retain the lockout lug 102 in the lockout recess 104 when the main control lever 22 is displaced from the neutral position, thereby locking the shift drive member 70 in the neutral position shown in FIG. 3. Also, the camming surfaces 106 prevent the shift drive member 70 from being returned to the engaged position until the main control 22 is in the neutral position.

Means preferably are provided for automatically returning the shift drive member 70 from the disengaged position to the engaged position when the main control lever 22 has been returned to the neutral position after being moved axially for independent actuation of the engine throttle. In a specific construction illustrated, such means (see FIG. 2) includes a helical spring 108 encircling the shaft member 24 and disposed between the cover section 16 and the shift drive member 70 with one end bearing against a shoulder on the bearing 26 and the other end received in an annular pocket 110 provided in the shift drive member 70. When the main control lever 22 is returned to the neutral position wherein the drive lug 80 is aligned with the drive notch 78, the spring 108 moves the shift drive member 70 to the engaged position.

In the event the spring 108 breaks or otherwise becomes inoperative, the shift drive member 70 can be manually returned to the drive position by pushing inwardly on the lower portion of the main control lever 22. As the shaft member 24 is moved laterally inwardly, the shoulder 74 causes the shift drive member 70 to also be moved laterally inwardly.

Means can be provided for releasably locking the main control lever 22 in a neutral position. In the specific construction illustrated, such means (see FIGS. 2 and 6) comprises a neutral lock mechanism including a locking slide or arm 112 slidably mounted on the inner side of the main control lever 22, a hand grip 114 which extends laterally from the upper end of the locking arm 112 and is located beneath a knob 116 on the upper end of the main control lever 22, and a spring 118 interposed the knob 116 and the locking arm 112 and biasing the locking arm 112 and the hand grip 114 in a direction away from the knob 116.

Mounted on the exterior of the cover section 14 coaxially with the shaft member 24 is a circular plate 120 including a central aperture 122 through which the outer end of the shaft member 24 extends and a notch 124 adapted to receive the lower end of the locking arm 112 and releasably lock the main control lever 22 in a neutral position. After the lower end of the locking arm 112 is retracted from the notch 124 by squeezing the hand grip 114, the lower end of the locking arm 112 rides along the peripheral edge of the plate 120 as the main control lever 22 is rotated from and towards the neutral position.

Various components of the single lever control preferably are arranged so that the main control lever 22 can be mounted on either side of the housing 15 by using the same components and simply assembling them in a different manner. More specifically, the cover section 16 is provided with an external recess 62 like the recess 62 in the cover section 17 so that the shaft member 24 and the throttle control member 42 can be flipped over or rotated end over end from the position shown in FIGS. 2 and 5 with the shaft member 24 journaled in the bearing 26. The cover section 17 is provided with a lockout recess 104, like the lockout recess 104 in the cover section 16, to accommodate the drive lug 80 on the shift drive member 70 which is also flipped over 180°. In addition, the positions of the cables 30 and 64, the gear shift lever 63, the throttle lever 28 and the arm 34 are reversed from that shown in FIGS. 2 and 5. The throttle drive member 42 is provided with an extra set of drive link mounting apertures 53 to accommodate the reverse location of the drive link 50. Further, the cover section 17 is provided with holes (not shown) to accommodate mounting of the plate 120 on the exterior surface thereof.

The alternate embodiment illustrated in FIGS. 8–12 is constructed and operates in substantially the same manner as the embodiment illustrated in FIGS. 1–7. Accordingly, common components have been assigned the same reference numerals and similar components have been assigned the same reference numerals with the suffix "*a*". Only those components which differ in construction and operation have been assigned different reference numerals and will be described in detail.

Referring specifically to FIGS. 8, 10, 11 and 12, a pair of drive links **50*a* are pivotally connected at one end to a throttle drive member 42*a* and pivotally connected at the other end to a throttle lever 28*a* which is rotatably carried directly by the shaft 36. The throttle drive member 42*a* is arranged and operates in substantially the same manner as the throttle drive member 42 in the embodiment illustrated in FIGS. 1–7, except the drive links 52*a*** are located on the opposite sides thereof rather than a single drive link being located in a slot.

The shaft member **24*a* (see FIG. 8) includes, on the inner end, a shoulder 126 which serves the same purpose as the retainer ring 76 described above, i.e., engages the shift drive member 70*a* and causes disengagement of the shift drive member 70*a* from the throttle drive member 42*a* when the main control lever 22*a* is moved axially or laterally relative to the housing 12*a***.

The detent means (see FIGS. 8, 11 and 12) for indicating the neutral position and ends of the forward and reverse ranges of the gear shift lever **63*a* comprises a ball 128 slidably mounted in a recess 130 in a boss 134 located on the periphery of the shift drive member 70*a* and biased outwardly by a spring 136 to engage notches 138, 140, and 142 provided in an arcuate member 144 mounted on the interior of the cover section 14*a*. The notches 138, 140, and 142 are positioned at locations corresponding to the neutral position, the end of the forward range and the end of the reverse range of the gear shift lever 63*a***, respectively.

The means for releasably locking the main control lever **22*a* in the neutral position comprises a (see FIGS. 8 and 9) locking slide or arm 146 slidably mounted on the inner side of the main control lever 22*a* and having, on the lower end, an inturned tab 148 which is received in an arcuate recess 150 provided in the exterior of the cover section 16*a*. The arcuate recess 150 includes a notch 152 which is located at a position corresponding to the neutral position of the main control lever 22*a* and into which the locking arm tab 148 is biased by the spring 118. After the locking arm tab 148 is retracted from the notch 152 by squeezing the hand grip 114, the tab 148 rides along the recess 150 as the main control lever 22*a* is rotated away from and toward the neutral position. A knob 154 is provided on the lower end of the main control lever 22*a*** to assist in moving the main control lever laterally outwardly when independent actuation of the engine throttle is desired.

As with the embodiment illustrated in FIGS. 1–7, various components preferably are arranged so that the main control lever **22*a* can be mounted on either side of the housing 15*a*. In addition to the recess 62*a* in the housing section 16*a*, the additional drive link mounting holes 53 in the throttle drive member 42*a*, and the lockout recess 104*a* in the cover section 17*a*, for the purpose described above, the housing section 17*a* is provided with an arcuate recess 150 like the recess 150 in the housing section 16*a* for accommodating the locking arm 146**.

While in the specific construction illustrated and described in detail the drive means include a drive lug on the clutch shift drive member and a recess or notch in the throttle drive member, it is within the scope of the invention to provide one or more drive lugs on the throttle drive member and provide the clutch shift drive member with a corresponding number of recesses or notches which receive and are drivingly engaged by the throttle drive member lugs when the shaft member is in the first position. Also, the lockout means, instead of including a laterally projecting lug on the clutch shift drive member, can include a radially extending ear on the clutch shift drive member, an inwardly extending arcuate bearing surface on the interior of the housing engaged by the ear to prevent axial movement of the clutch shift drive member when the main control lever is displaced from the neutral position, and a recess on the bearing surface located to receive the ear and permit axial movement of the clutch shift drive member when the main control lever is in the neutral position.

Various of the features of the invention are set forth in the following claims.

What is claimed is:

1. A single lever control comprising a housing, a shaft member supported within said housing for rotation relative to said housing and for axial movement relative to said housing between first and second positions, a main control lever, means connecting said shaft member to said main control lever for common rotation therewith from a neutral position and for common axial movement therewith, a throttle drive member supported within said housing for rotation coaxially with said shaft member, means connecting said throttle drive member to said shaft member for common rotation therewith and for permitting axial movement of said shaft member relative to said throttle drive member in response to axial movement of said main control lever, a clutch shift drive member supported within said housing for coaxial rotation relative to said throttle drive member between a neutral position and a shift position, means connecting said clutch shift drive member to said shaft member for common axial movement therewith and for relative rotary movement therebetween, and drive means on said throttle drive member and on said clutch shift drive member located for engagement to provide common rotary movement of said throttle drive member and said clutch shift drive member when said shaft member is in the first position and for disengagement to permit rotation of said throttle drive member relative to said clutch shift drive member, in response to rotational movement of said main control lever, when said shaft member is in the second position.

2. A single lever control according to claim 1 including a gear shift lever adapted to actuate a remotely located clutch of an engine and mounted for movement between a neutral position and a shift position, and means connecting said gear shift lever and said clutch shift drive member for movement of said gear shift lever from the neutral position to the shift position in response to movement of said main control lever from the neutral position and for permitting axial movement of said clutch shift drive member relative to said gear shift lever in response to axial movement of said main control lever.

3. A single lever control according to claim 1 including lockout means for permitting axial movement of said clutch shift drive member from an engaged position to a disengaged position when said main control lever is in the neutral position and for preventing axial movement of said clutch shift drive member from the engaged position when said main control lever is displaced from the neutral position.

4. A single lever control according to claim 3 wherein said lockout means further includes means for preventing both rotational movement of said clutch shift drive member from the neutral position and axial movement of said clutch shift member from the disengaged position when said shaft member is in the second position and said main control lever is displaced from the neutral position.

5. A single lever control according to claim 1 including means for biasing said shaft member towards the first position.

6. A single lever control according to claim 1 wherein said drive means includes a notch in said throttle drive member, a drive lug on said shift drive member drivingly engaged with said throttle drive member notch when said shaft member is in the first position and disengaged from said throttle drive member notch when said shaft member is in the second position.

7. A single lever control according to claim 1 wherein said means connecting said throttle drive member to said shaft member includes an axially extending hub on said throttle drive member having a plurality of axially extending, circumferentially spaced first splines, and a central bore in said shaft member having a plurality of axially extending, circumferentially spaced second splines meshing with said first splines.

8. A single lever control according to claim 3 wherein said lockout means includes a recess in said housing, and a lockout lug on said clutch shift drive member located to project into and engage said housing recess when said shaft member is moved to the second position with said main control lever in the neutral position.

9. A single lever control according to claim 8 wherein said lockout means further includes a camming surface extending on said throttle drive member from said notch and adapted to engage the outer end of said drive lug when said main control lever is displaced from the neutral position after said shaft member has been moved to the second position, and thereby retain said lockout lug in said housing recess.

10. A single lever control according to claim 5 wherein said housing has a wall and wherein said biasing means comprises a helical spring encircling said shaft member and interposed said clutch shift drive member and said housing wall.

11. A single lever control comprising a housing, a shaft member supported within said housing for rotation relative to said housing and for axial movement relative to said housing between a first position and a second position axially spaced from the first position, a main control lever connected to said shaft member for common rotation therewith from a neutral position and for common axial movement therewith, a throttle drive member connected with said shaft member for common rotation therewith and for axial movement of said shaft member relative thereto, a clutch shift drive member mounted on said shaft member for common axial movement therewith relative to said throttle drive member and for rotation relative to said shaft member, a notch in said throttle drive member, a drive lug on said clutch shift drive member located to drivingly engage said throttle drive member notch when said main control lever is in the neutral position and said shaft member is in the first position and to be disengaged from said throttle member notch when said shaft member is in the second position, and lockout means on said housing, on said clutch shift drive member and on said throttle drive member for permitting axial movement of said shaft member from the first position to the second position when said control lever is in the neutral position, for preventing axial movement of said shaft member from the first position to the second position when said main control lever is displaced from the neutral position, and for preventing both pivotal movement of said clutch shift drive member from the neutral position and axial movement of said clutch shift drive member from the disengaged position when said shaft member is in the second position and said main control lever is displaced from the neutral position.

12. A single lever control according to claim 11 including means for biasing said shaft member toward the first position.

13. A single lever control according to claim 11 wherein said lockout means including a recess in said housing, a lockout lug on said clutch shift drive member located to project into and engage said housing recess when said shaft member is moved to the second position with said main control lever in the neutral position, a camming surface extending on said throttle drive member from said notch and adapted to engage the outer end of said drive lug when said main control lever is displaced from the neutral position after said shaft member has been moved to the second position, and thereby retain said lockout lug in said housing recess.

14. A single lever control comprising a housing, a shaft member supported within said housing for rotation relative to said housing and for axial movement relative to said housing between first and second positions, a main control lever adapted to be connected to the throttle of an engine, means connecting said shaft member to said main control lever for common rotation therewith from a neutral ppsition and for common axial movement therewith, a clutch shift drive member adapted to be connected to the clutch of an engine and supported within said housing for coaxial rotation relative to said shaft member between a neutral position and a shift position and for common axial movement therewith, drive means for releasably connecting said clutch shift drive member and said shaft member to provide common rotary movement of said shaft member and said clutch shift drive member when said shaft member is in the first position and to permit relative rotation of said shaft member to said clutch shift drive member, in response to rotational movement of said main control lever, when said shaft member is in the second position.

* * * * *